(12) United States Patent
Stocks et al.

(10) Patent No.: US 10,738,875 B2
(45) Date of Patent: Aug. 11, 2020

(54) CONTINUOUSLY VARIABLE TRANSMISSION

(71) Applicant: Textron Inc., Providence, RI (US)

(72) Inventors: John Stocks, Graniteville, SC (US); Scott Allen Wohlgamuth, Hephzibah, GA (US); Landon Ball, North Augusta, SC (US); Timothy Kolody, Grovetown, GA (US); Christopher Furman, Evans, GA (US)

(73) Assignee: TEXTRON INC., Providence, RI (US)

( * ) Notice: Subject to any disclaimer, the term of this patent is extended or adjusted under 35 U.S.C. 154(b) by 297 days.

(21) Appl. No.: 15/829,161

(22) Filed: Dec. 1, 2017

(65) Prior Publication Data

US 2018/0087652 A1  Mar. 29, 2018

Related U.S. Application Data

(63) Continuation of application No. 15/075,583, filed on Mar. 21, 2016, now Pat. No. 9,863,523.

(51) Int. Cl.
  *F16H 57/04* (2010.01)
  *F16H 57/035* (2012.01)
  *F16H 9/14* (2006.01)
  *F16H 57/02* (2012.01)

(52) U.S. Cl.
  CPC ........... *F16H 57/0416* (2013.01); *F16H 9/14* (2013.01); *F16H 57/035* (2013.01); *F16H 57/0489* (2013.01); *F16H 2057/02065* (2013.01)

(58) Field of Classification Search
  CPC ...... F16H 57/0489; F16H 57/035; F16H 9/18; F16H 57/0416; F16H 2057/0203
  USPC ........................................................ 474/144
  See application file for complete search history.

(56) References Cited

U.S. PATENT DOCUMENTS

| | | | | |
|---|---|---|---|---|
| 4,631,977 A | * | 12/1986 | Kawashima | B62M 9/06 474/150 |
| 4,671,782 A | * | 6/1987 | Ochiai | B62M 7/06 474/93 |
| 4,697,665 A | * | 10/1987 | Eastman | B62K 5/01 123/195 C |
| 4,708,699 A | * | 11/1987 | Takano | F02B 77/13 474/144 |
| 5,086,858 A | | 2/1992 | Mizuta et al. | |

(Continued)

*Primary Examiner* — Henry Y Liu
(74) *Attorney, Agent, or Firm* — Sandberg Phoenix & von Gontard, P.C.

(57) ABSTRACT

A continuously variable transmission housing including an inner cover and an outer cover that define an interior chamber that is structured and operable to enclose a continuously variable transmission primary pulley, secondary pulley and pulley belt. The housing includes a duct panel mounted to the inner cover such that when the primary pulley is disposed within the interior chamber, the duct panel is disposed between an outer face of the primary pulley and the inner cover. An air duct is defined between the inner cover and the duct panel, wherein the air duct is fluidly connected to ambient air from an ambient environment external to the housing. The duct panel forms at least a portion of an ambient air inlet of the housing and includes a center opening that structured and operable to allow the ambient air to be drawn through the air duct and into the housing interior chamber.

12 Claims, 11 Drawing Sheets

(56) References Cited

U.S. PATENT DOCUMENTS

| | | | |
|---|---|---|---|
| 5,171,189 A * | 12/1992 | Douhairet | F16G 5/166 474/144 |
| 6,238,312 B1 * | 5/2001 | Tsubata | F16H 37/021 474/144 |
| 6,267,700 B1 * | 7/2001 | Takayama | F02B 61/02 474/144 |
| 6,808,465 B2 * | 10/2004 | Kuga | F16H 9/18 180/227 |
| 6,863,145 B2 | 3/2005 | Ebert | |
| 7,201,686 B2 * | 4/2007 | Masuda | B62M 7/02 180/230 |
| 7,281,596 B2 * | 10/2007 | Fukuda | F16H 57/0415 180/376 |
| 7,303,495 B2 * | 12/2007 | Schoenek | F16C 35/067 384/542 |
| 7,316,626 B2 * | 1/2008 | Oishi | B62M 7/02 123/195 A |
| 7,341,533 B2 * | 3/2008 | Wang | F16H 57/021 427/449 |
| 7,354,364 B2 * | 4/2008 | Glas | F16H 59/36 474/140 |
| 7,363,999 B2 | 4/2008 | Hastings | |
| 7,427,248 B2 * | 9/2008 | Chonan | F16H 57/05 474/150 |
| 7,540,815 B2 * | 6/2009 | Brown | F16H 9/18 474/144 |
| 7,556,576 B2 * | 7/2009 | Mochizuki | F16H 9/18 474/18 |
| 7,617,899 B1 * | 11/2009 | Warner | B62M 27/02 180/190 |
| 7,686,123 B2 * | 3/2010 | Ishida | B62K 11/04 180/219 |
| 7,771,299 B2 * | 8/2010 | Mochizuki | F16H 9/18 180/229 |
| 8,038,557 B2 * | 10/2011 | Aoyama | F16H 9/18 474/144 |
| 8,157,038 B2 | 4/2012 | Ishida et al. | |
| 8,202,181 B2 * | 6/2012 | Oishi | B62M 7/02 474/144 |
| 8,317,653 B2 | 11/2012 | Nogi | |
| 8,323,134 B2 * | 12/2012 | Tsukada | F16H 61/66259 474/144 |
| 8,337,346 B2 * | 12/2012 | Kochidomari | B60K 17/08 180/366 |
| 8,382,620 B2 * | 2/2013 | Morita | F16H 9/18 474/13 |
| 8,596,406 B2 * | 12/2013 | Itoo | F16H 57/0416 165/42 |
| 8,776,930 B2 | 7/2014 | Tadych et al. | |
| 8,834,307 B2 * | 9/2014 | Itoo | F16H 57/0416 474/93 |
| 8,840,496 B2 * | 9/2014 | Yamanishi | B60K 11/08 180/68.1 |
| 8,911,312 B2 * | 12/2014 | Itoo | F16H 57/03 474/93 |
| 9,140,340 B2 * | 9/2015 | Lai | F16H 57/0416 |
| 9,217,501 B2 | 12/2015 | Deckard et al. | |
| 9,341,255 B2 * | 5/2016 | Itoo | F16H 57/0489 |
| 9,366,331 B2 * | 6/2016 | Eberhardt | F16H 57/0416 |
| 9,453,573 B2 * | 9/2016 | Renner | F16H 57/0489 |
| 9,528,595 B2 * | 12/2016 | Itoo | F16H 57/031 |
| 9,771,112 B2 | 9/2017 | Spindler et al. | |
| 9,909,659 B2 * | 3/2018 | Bessho | F16H 57/027 |
| 10,197,149 B2 * | 2/2019 | Kuji | F16H 57/0416 |
| 2003/0083167 A1 * | 5/2003 | Hammerbeck | F16H 9/02 474/239 |
| 2004/0033851 A1 * | 2/2004 | Lubben | F16C 25/06 474/8 |
| 2004/0102267 A1 * | 5/2004 | Murakami | F16H 7/08 474/69 |
| 2004/0171449 A1 * | 9/2004 | Oishi | B62M 7/02 474/144 |
| 2004/0224806 A1 * | 11/2004 | Chonan | F16H 57/0415 474/93 |
| 2005/0239591 A1 * | 10/2005 | Schoenek | F16C 35/067 474/144 |
| 2005/0239592 A1 * | 10/2005 | Schoenek | B62J 13/00 474/144 |
| 2005/0272544 A1 * | 12/2005 | Ho | F16H 57/031 474/144 |
| 2006/0122017 A1 * | 6/2006 | Masuda | B62M 9/04 474/144 |
| 2006/0154760 A1 * | 7/2006 | Brown | F16H 9/18 474/27 |
| 2006/0154761 A1 * | 7/2006 | Brown | F16H 55/56 474/28 |
| 2006/0172839 A1 * | 8/2006 | Masuda | B62M 7/02 474/144 |
| 2006/0270503 A1 * | 11/2006 | Suzuki | F16H 57/0415 474/144 |
| 2008/0032841 A1 * | 2/2008 | Oishi | B62M 7/02 474/242 |
| 2008/0176692 A1 * | 7/2008 | Teubert | F16H 9/18 474/206 |
| 2008/0314676 A1 * | 12/2008 | Ishida | B62K 11/04 180/366 |
| 2010/0120565 A1 * | 5/2010 | Kochidomari | B60K 17/08 474/144 |
| 2010/0167853 A1 * | 7/2010 | Morita | F16H 9/18 474/13 |
| 2012/0289370 A1 * | 11/2012 | Yamanishi | B60K 11/08 474/93 |
| 2013/0090198 A1 * | 4/2013 | Itoo | F16H 57/03 474/93 |
| 2013/0090199 A1 * | 4/2013 | Itoo | F16H 57/0416 474/93 |
| 2014/0038756 A1 * | 2/2014 | Lai | F16H 57/0416 474/28 |
| 2014/0135158 A1 * | 5/2014 | Tamura | F16H 57/028 474/144 |
| 2015/0024890 A1 * | 1/2015 | Eberhardt | F16H 57/0416 474/144 |
| 2015/0308561 A1 * | 10/2015 | Itoo | F16H 57/0489 474/93 |
| 2015/0377341 A1 * | 12/2015 | Renner | F16H 57/0489 474/93 |
| 2016/0061314 A1 | 3/2016 | Kuhl et al. | |
| 2016/0332676 A1 | 11/2016 | Miller et al. | |

\* cited by examiner

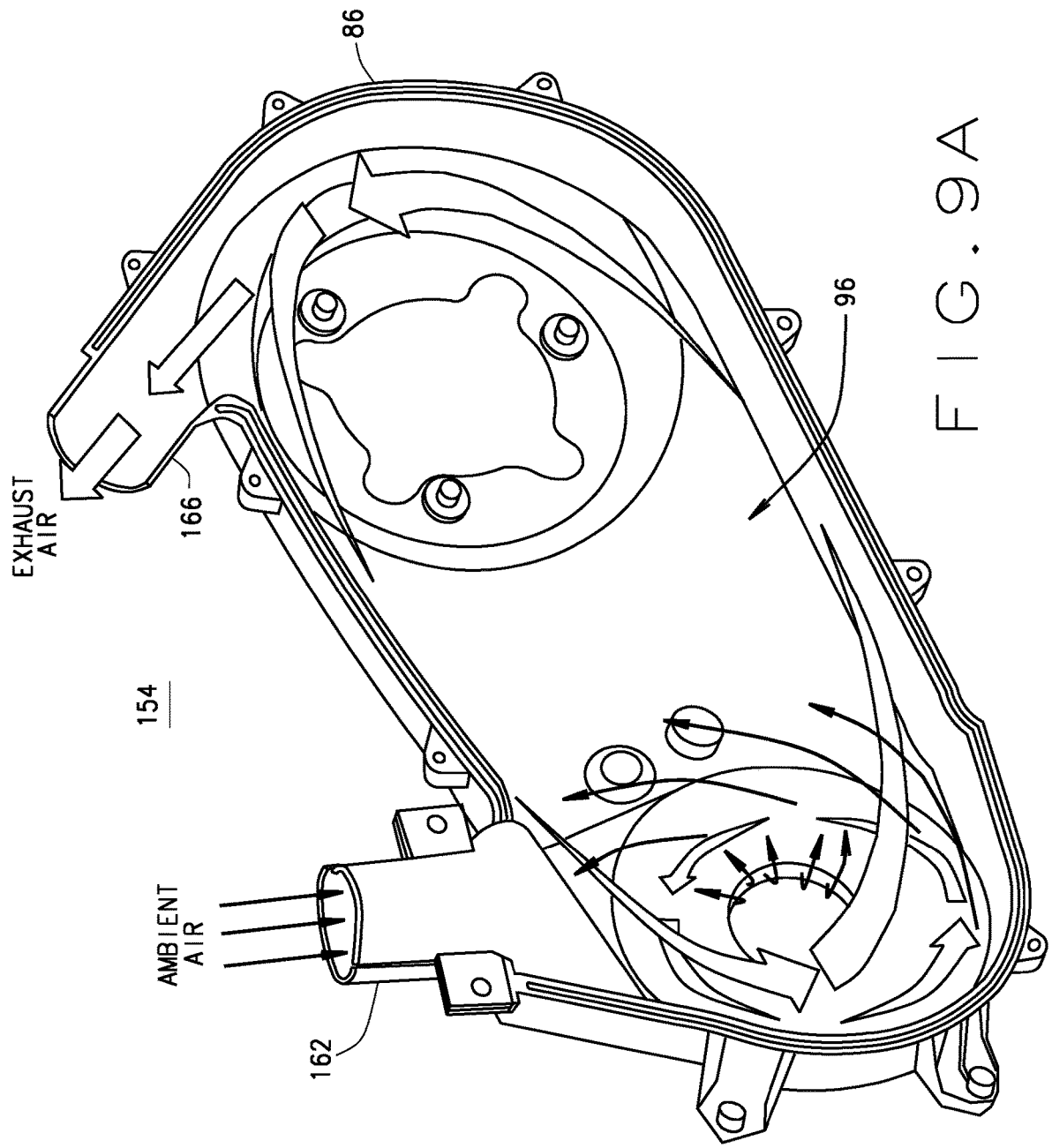

US 10,738,875 B2

CONTINUOUSLY VARIABLE TRANSMISSION

CROSS-REFERENCE TO RELATED APPLICATIONS

This application is a continuation of U.S. patent application Ser. No. 15/075,583 filed on Mar. 21, 2016. The disclosure of the above application is incorporated herein by reference in its entirety.

FIELD

The present teachings relate to continuously variable transmissions (CVTs), and more particularly to a CVT cover designed to keep the internal components of the CVT cool.

BACKGROUND

The statements in this section merely provide background information related to the present disclosure and may not constitute prior art.

Many of today's lightweight vehicles that are not designated for use on roadways, e.g., all-terrain vehicles (ATVs), utility terrain vehicles (UTVs), etc., implement a continuously variable transmission (CVT) to transfer and control the distribution of torque within the vehicle drivetrain. Due to the dust, water, mud, rocks, etc., commonly encountered in off-road environments, such CVTs typically comprise a housing or cover designed to protect the components, e.g., pulleys, bushings and belts, from the environment. However, such covers substantially enclose the components and trap heat generated during operation of the CVT. More particularly, the air within the cover is not easily exchanged with fresh cooler air and the components cannot cool off, thereby degrading the life of the components.

SUMMARY

In various embodiments, the present disclosure provides a continuously variable transmission housing that includes an inner cover and an outer cover connectable to the inner cover to define an interior chamber. The interior chamber is structured and operable to enclose a continuously variable transmission primary pulley, secondary pulley and pulley belt. The housing additionally includes a duct panel mounted to the inner cover such that when the primary pulley is disposed within the interior chamber, the duct panel is positioned between an outer face of a static sheave of the primary pulley and the inner cover. Moreover, an air duct is defined between the inner cover and the duct panel, wherein the air duct is fluidly connected to ambient air from an ambient environment external to the housing. The duct panel includes a center opening that is structured and operable to allow the ambient air to be drawn through the air duct and into the housing interior chamber.

In various other embodiments, the present disclosure provides a continuously variable transmission (CVT) that comprises a primary pulley operably connectable to an output shaft of a prime mover of a vehicle, a secondary pulley operably connectable to at least one wheel axle of the vehicle, and a pulley belt operably connecting the primary pulley to the secondary pulley to transfer torque from the primary pulley to the secondary pulley. The primary pulley includes a primary pulley shaft operably connectable to the prime mover output shaft, a static sheave fixedly mounted to the primary pulley shaft, and a dynamic sheave structured and operable to controllably move axially along the primary pulley shaft. The CVT additionally comprises a housing that includes an inner cover and an outer cover connectable to the inner cover to define an interior chamber. The interior chamber is structured and operable to enclose a continuously variable transmission primary pulley, secondary pulley and pulley belt. The housing additionally includes a duct panel mounted to the inner cover such that when the primary pulley is disposed within the interior chamber, the duct panel is positioned between an outer face of a static sheave of the primary pulley and the inner cover. Moreover, an air duct is defined between the inner cover and the duct panel, wherein the air duct is fluidly connected to ambient air from an ambient environment external to the housing. The duct panel includes a center opening that is structured and operable to allow the ambient air to be drawn through the air duct and into the housing interior chamber. Furthermore, the outer face of the primary pulley static sheave comprises a plurality of low pressure fins that are structured and operable to generate a vacuum effect at the air duct center opening as the primary pulley is rotated, thereby generating a vacuum effect, or suction, within the air duct that draws the ambient air through the air duct and into the interior chamber of the housing via the duct panel center opening. The housing further includes an exhaust outlet that fluidly connects the interior chamber with the ambient environment. Accordingly, the ambient air drawn into the interior chamber can be circulated around the primary pulley, secondary pulley and pulley belt and exhausted out the exhaust outlet, thereby cooling the components.

This Summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 9A is an isometric view of the CVT inner cover illustrating an air flow through an interior chamber of the CVT that is drawn in through the air duct as result of low pressure generated by the low pressure generating fins as the primary pulley rotates, in accordance with various embodiments of the present disclosure.

Corresponding reference numerals indicate corresponding parts throughout the several views of drawings.

DETAILED DESCRIPTION

Figure 1:
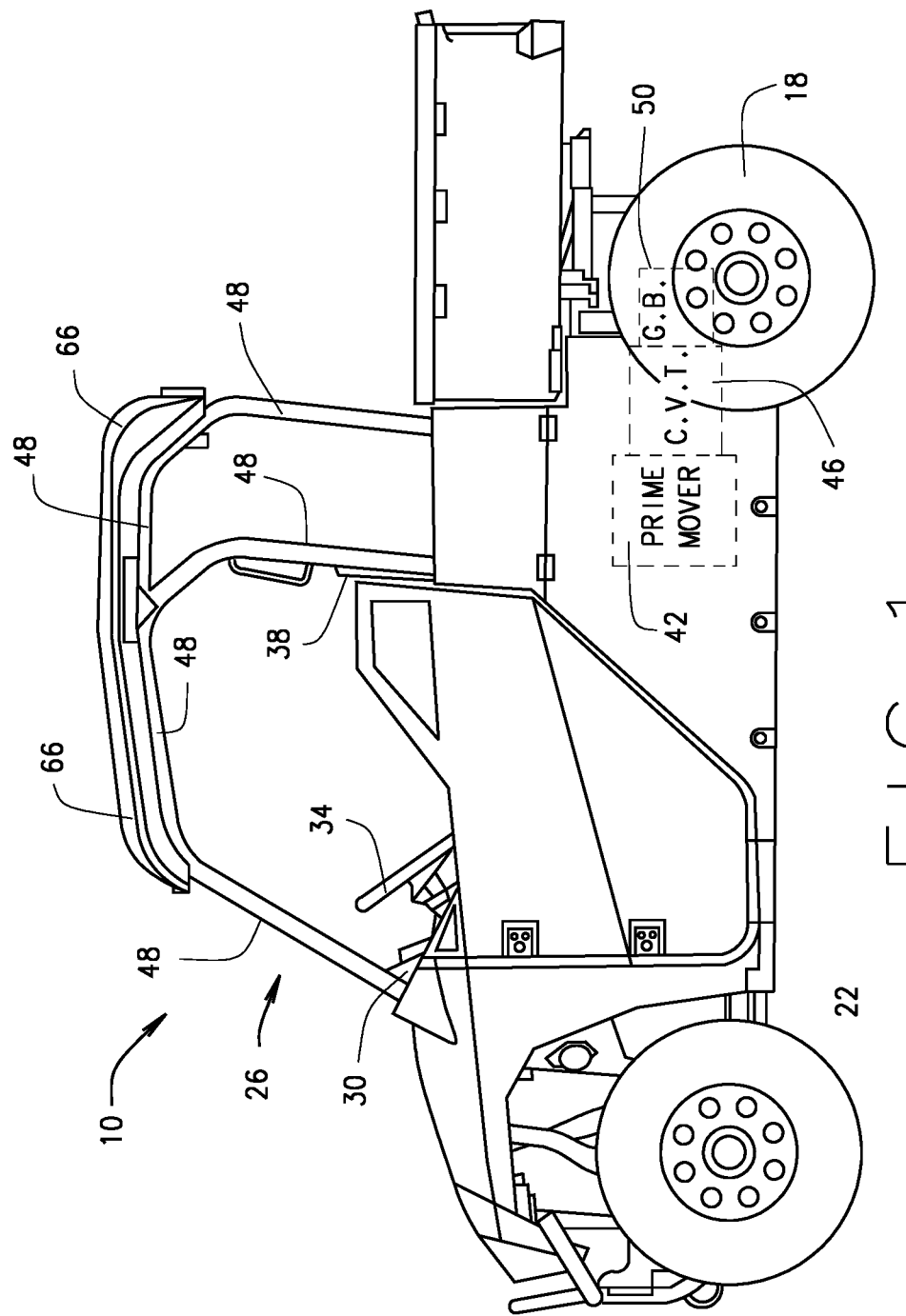
FIG. 1 is a side view of a utility vehicle including a self-cooling continuously variable transmission (CVT), in accordance with various embodiments of the present disclosure.

The embodiments disclosed below are not intended to be exhaustive or to limit the invention to the precise forms disclosed in the following detailed description. Rather, the embodiments are chosen and described so that others skilled in the art can utilize their teachings. Because many varying and different embodiments may be made within the scope of the concept(s) taught herein, and because many modifications may be made in the embodiments described herein, it is to be understood that the details herein are to be interpreted as only illustrative and non-limiting. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. Additionally, the relative size and arrangement of the components may differ from that shown and still operate within the spirit of the invention. Throughout this specification, like reference numerals will be used to refer to like elements.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. may be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Furthermore, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation.

While the present disclosure is primarily described with regard to a CVT and CVT housing for use in an off-road utility vehicle, it should be understood that the features of the CVT and CVT housing disclosed herein can be applied, within the scope of the disclosure, to other types of vehicles such as most lightweight vehicles that are not designated for use on roadways, e.g., maintenance vehicles, cargo vehicles, shuttle vehicles, golf carts, other all-terrain vehicles (ATVs), utility task vehicles (UTVs), recreational off-highway vehicles (ROVs), side-by-side vehicles (SSV), worksite vehicles, buggies, motorcycles, watercraft, snowmobiles, tactical vehicles, etc.

Figure 2:
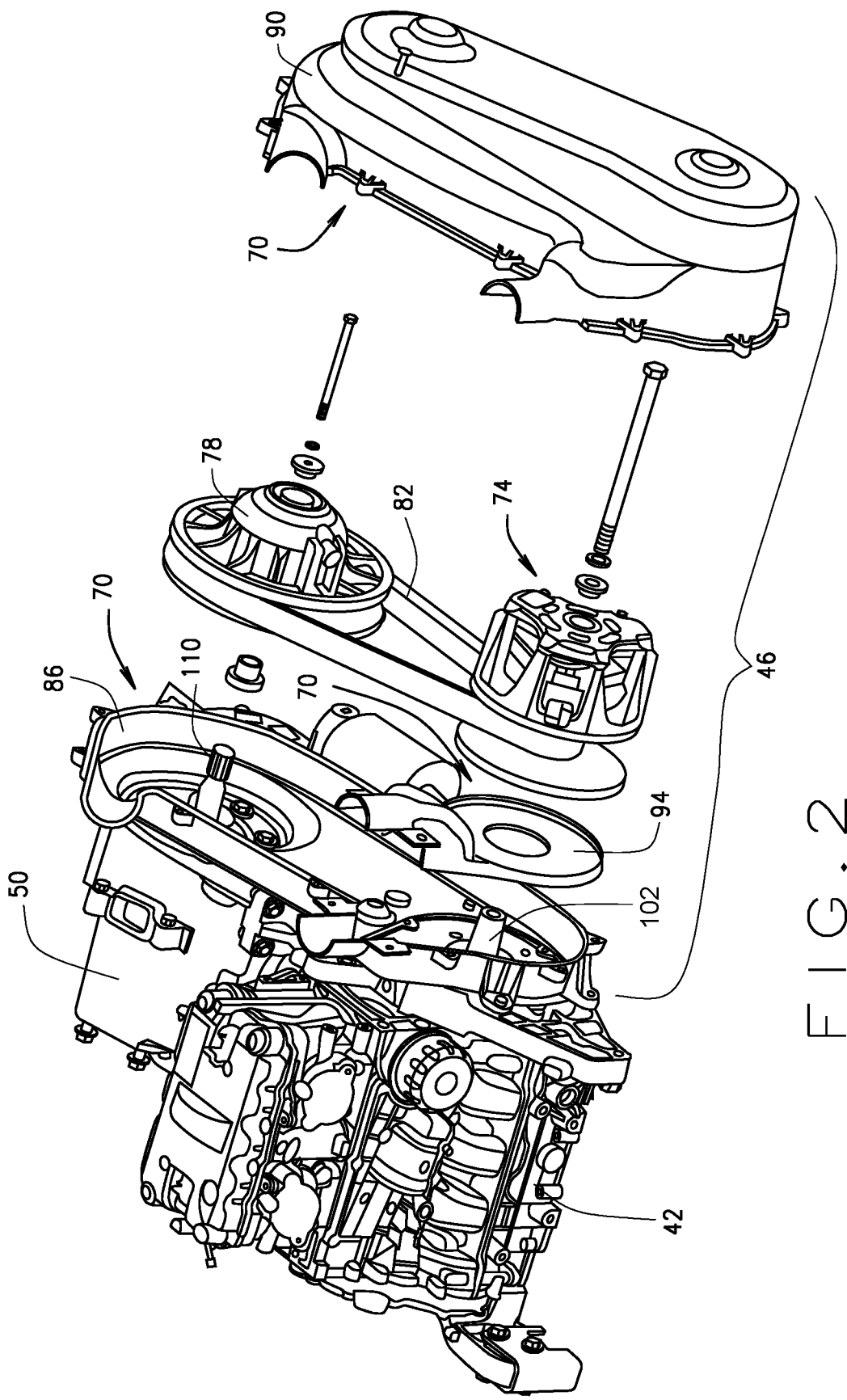
FIG. 2 is an isometric exploded view of the CVT shown in FIG. 1 operably coupled to an engine and gearbox, in accordance with various embodiments of the present disclosure.
Figure 3:
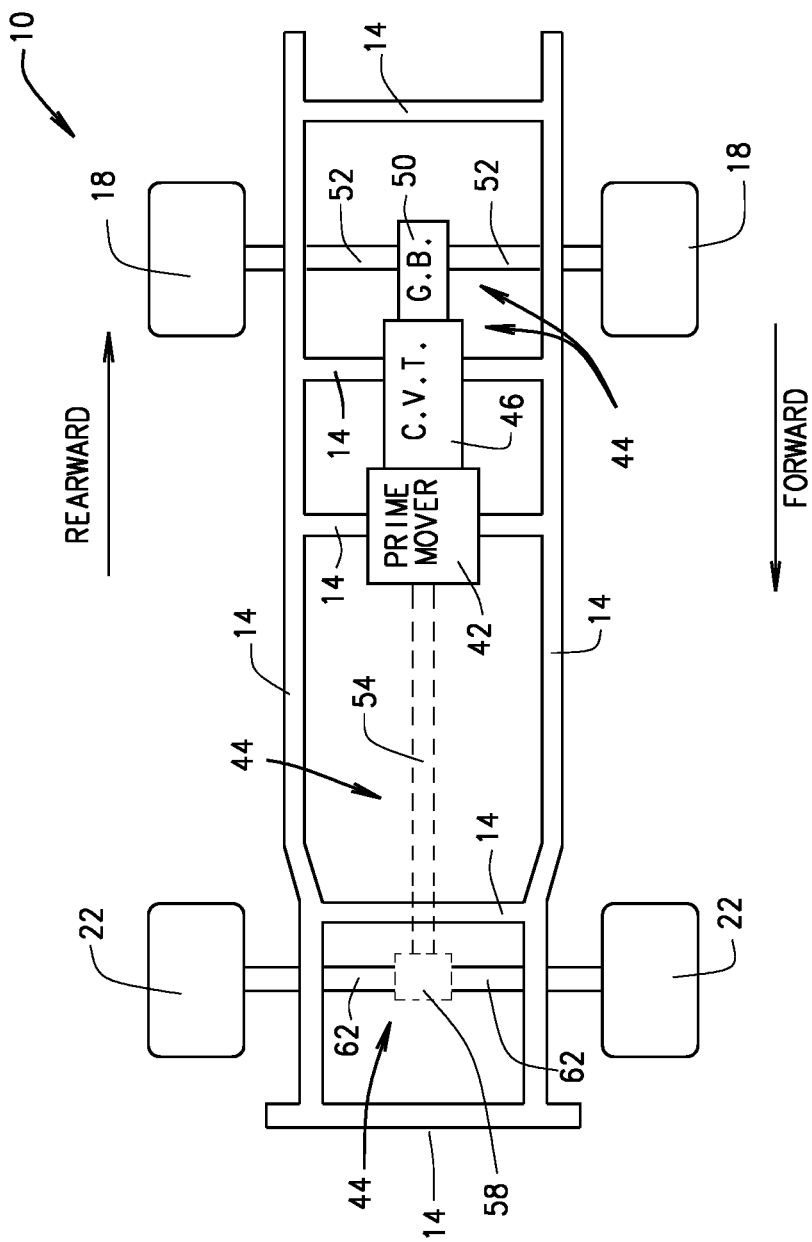
FIG. 3 is a schematic of a chassis, a prime mover and a drivetrain of the vehicle shown in FIG. 1, in accordance with various embodiments of the present disclosure.
Figure 4:
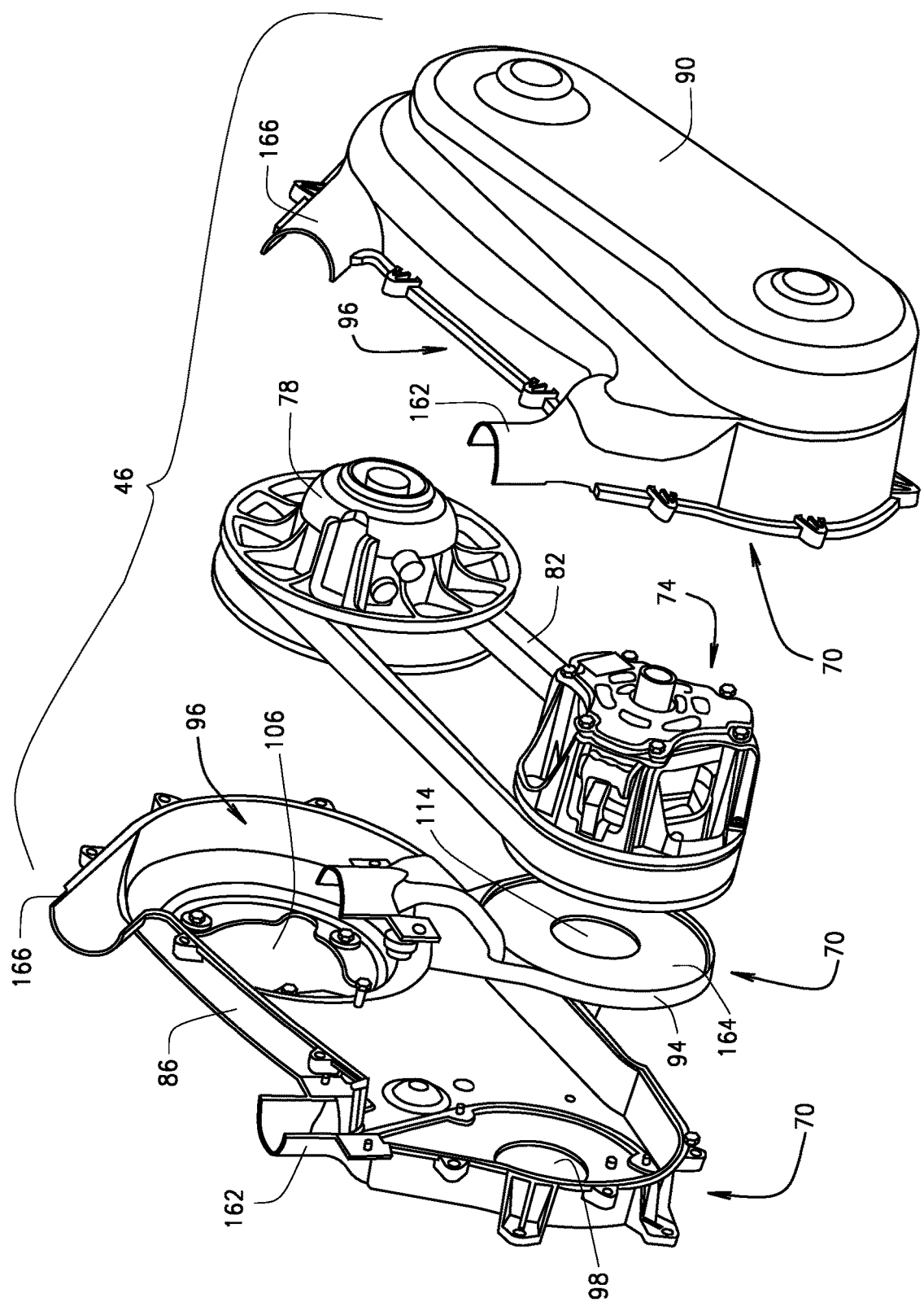
FIG. 4 is an isometric exploded view of the CVT shown in FIG. 1, in accordance with various embodiments of the present disclosure.
Figure 5:
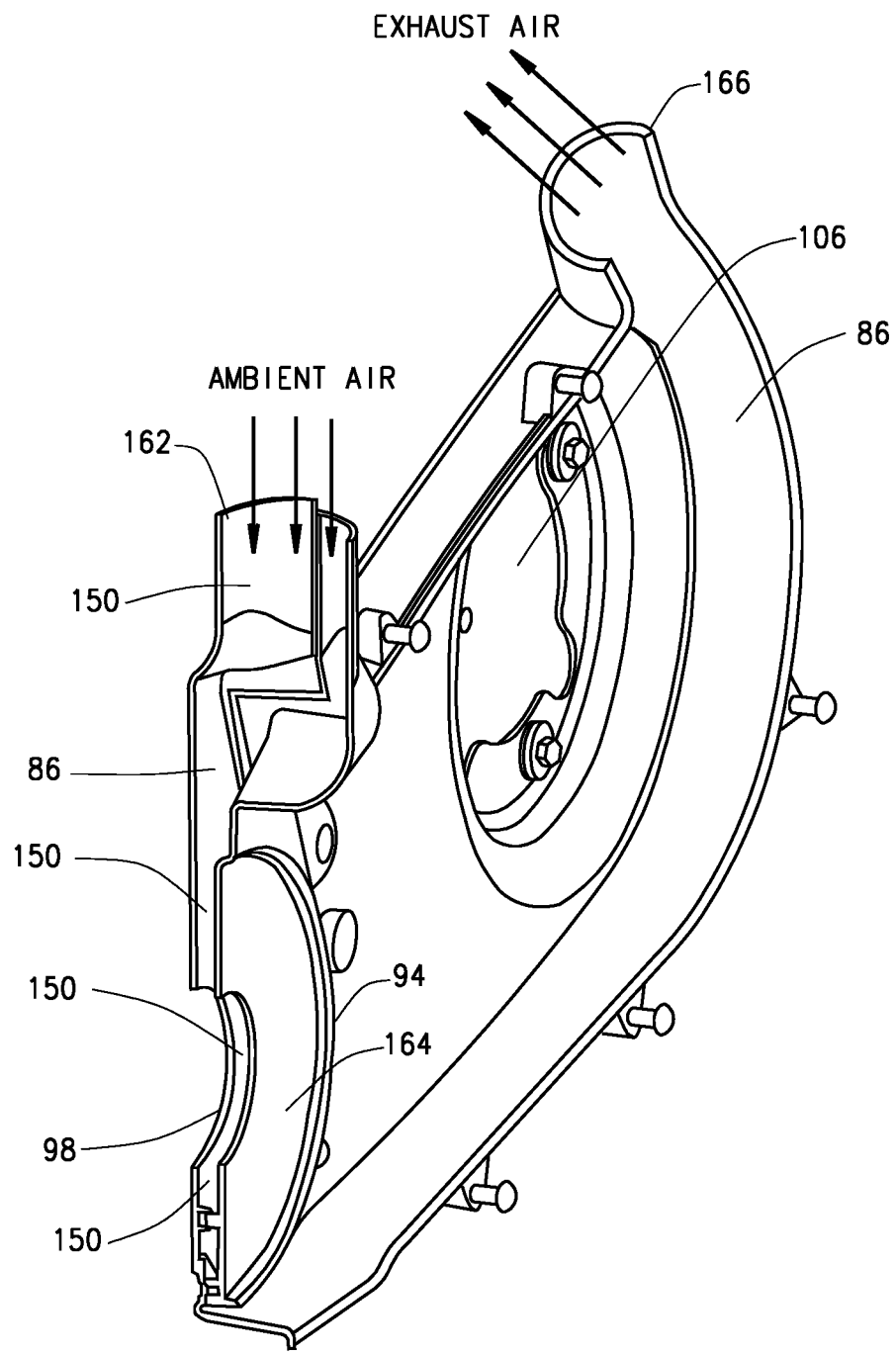
FIG. 5 is an isometric sectional view of an inner cover of the CVT shown in FIG. 1 having a duct panel attached thereto to form an air duct therebetween, in accordance with various embodiments of the present disclosure.

Referring to FIGS. 1, 2 and 3, in various embodiments, the present disclosure provides an off-road utility vehicle 10 that generally includes a chassis or frame 14, a pair of rear wheels 18 and a pair of front wheels 22 operationally connected to the chassis 14 and/or other frame structure of the vehicle 10, and a passenger compartment 26. The vehicle 10 can be any four-wheel drive or two-wheel drive lightweight vehicle that is not designated for use on roadways. The passenger compartment 26 generally includes a dash console 30, a steering wheel 34, a floorboard (not shown, but understood), and a passenger seating structure 38. The dash console 30 can include one or more instrument displays, gauges, vehicle control devices and/or storage compartments, e.g., an On/Off key switch, a forward/neutral/reverse selector, one or more small accessory storage pockets, one or more telemetry gauges/readouts (e.g., a speedometer, tachometer, temperature gauge, etc.) an electronic display (e.g., an LCD display that can have touch capabilities), a radio, and/or various other vehicle controls. The steering wheel 34 is for use by the vehicle operator to control the directional movement of the vehicle 10. The floorboard is structured and operable to enclose a bottom of, and provide a floor for, the passenger compartment 26.

The seating structure 38 is structured and operable to provide seating for one or more vehicle occupants, e.g., a driver and one or more passengers, and can include one or more seats. For example, in various embodiments the seating structure 38 can be a side-by-side seating structure comprising a single row of two or more laterally spaced (with regard to a longitudinal axis of the vehicle 10) separate and independent seats. Alternatively, the seating structure 38 can comprise a single row bench seat capable of seating two or more passengers side-by-side, two rows of bench seats, or two rows of side-by-side seats comprising four or more separate and independent seats, etc.

The vehicle 10 additionally includes a prime mover 42 mounted to the chassis 14, and a drivetrain 44 operationally connected to at least one of the front and/or rear wheels 22 and/or 18, and the prime mover 42. The prime mover 42 is structured and operable to generate torque (e.g., motive force, e.g., power) utilized to provide motive force for the vehicle 10 via the drivetrain 44, as described herein. Although the prime mover 42 is primarily described herein as an internal combustion engine (ICE), it should be understood that the prime mover 42 can be an electric motor, a hybrid combination of an ICE and an electric motor, or any other suitable motor or engine and remain within the scope of the present disclosure. In embodiments in which the prime mover 42 is embodied as or comprises an ICE, the ICE can be configured to utilize any suitable combustible fuel, such as gasoline, diesel, natural gas, biofuel, some combination thereof, etc.

Still further, in various embodiments, the vehicle 10 can include a roll over protection system (ROPS) 48 that is disposed above and around at least a portion of the passenger compartment 26 and is structured and operable to protect passengers within the passenger compartment 26 in a situation where the vehicle 10 may be caused to overturn or roll over. The ROPS 48 comprises a plurality of tubes, bars or beams that are connected to the chassis 14 and extend above, over and around at least a portion of the passenger compartment 26. The ROPS 48 can be constructed or fabricated of any material having sufficient strength and rigidity to provide protection to the passengers of the vehicle 10 should the vehicle 10 be upset and turned on its side or rolled over, e.g., steel, aluminum, titanium, carbon fiber, etc. Further yet, in various embodiments that vehicle 10 can include a roof structure 66 connected or mounted to at least a portion of the ROPS 48. The roof structure 66 is structured and operable to protect the passenger compartment 26, particularly passengers within the passenger compartment 26, from environmental elements such as sun, rain, sleet, snow, etc.

The drivetrain 44 includes a self-cooling continuously variable transmission (CVT) 46 that is operably connected to the prime mover 42 to receive torque from the prime mover 42, and operably connected to at least one of the rear and front wheels 18 and 22 to deliver torque to at least one of the rear and front wheels 18 and 22. In various embodiments, the CVT 46 can be operably connected to at least one of the rear and front wheels 18 and 22 via one or more rear and/or front wheel axles 52 and/or 62 that are operably connected to the CVT 46. Additionally or alternatively, in various embodiments the CVT 46 can be operably connected to at least one of the rear and front wheels 18 and 22 via a first gearbox 50. In such embodiments, the first gearbox 50 is operably connected to the CVT 46 and at least one rear and front wheel 18 and 22 is operably connected to the first gearbox 50 via one or more rear and/or front wheel axles 52 and/or 62 and/or a driveshaft 54, as described further below. For simplicity, the CVT 46 will be described herein as operably connected to at least one of the rear and front wheels 18 and 22 via the first gearbox 50.

The CVT 46 is structured and operable to receive torque (e.g., motive force, e.g., power) generated by the prime mover 42 and controllably transfer the torque to the first gearbox 50. Particularly, when transferring the torque to the first gearbox 50, the CVT 46 is structured and operable to continuously vary the amount of torque delivered to the gearbox 50. That is, the amount of torque delivered can continuously be increased, decreased and/or not changed by the CVT 46. The first gearbox 50 is structured and operable to transfer and distribute the torque to one or more of the wheels 18 and/or 22. For example, in various embodiments, the first gearbox 50 can be operably connected to a rear axle 52 and structured and operable to transfer and distribute the torque output by the CVT 46 to at least one of the rear wheels 18. The rear axle 52 can be either a split axle for an independent suspension system, or a one-piece axle. In various other embodiments, in addition to transferring and distributing the torque to at least one of the rear wheels 18, the first gearbox 50 can include a power take off (PTO) such that the first gearbox 50 can also transfer and distribute the torque output by the CVT 46 to at least one of the front wheels 22, as described below. The first gearbox 50 can be a torque transfer device such as a transmission and/or a differential and/or a transaxle, etc. For example, in various implementations, the first gearbox 50 can be a multi-speed gearbox and, in various instances, include a differential for distributing the torque to one or more of the wheels 18 and/or 22.

In some embodiments, the drivetrain 44 can be configured to provide a 4-wheel drive (4WD) vehicle or a 2-wheel drive (2WD) vehicle, and remain within the scope of the present disclosure. In various embodiments in which the drivetrain 44 is configured to provide a 2WD vehicle, the vehicle 10 can be driven by the rear wheels 18 (e.g., a rear wheel drive vehicle) or by the front wheels 22 (e.g., a front wheel drive vehicle). In some embodiments in which the vehicle 10 can be configured as a 4WD vehicle, the vehicle 10 can be selectively operated in two or more drive modes, such as a 2WD mode and a 4WD mode, through actuation of a switch or other user input device that can be disposed on the instrument panel 30.

In the various embodiments in which at least one of the front wheels 22 receive torque from the CVT 46 (e.g., front wheel 2WD and/or 4WD embodiments), the drivetrain 44 can include a driveshaft 54 and a second gearbox (or differential) 58. In such embodiments, the driveshaft 54 is operably connected at one end to the CVT 46 or the first gearbox 50 via a PTO and operably connected at the opposing end to the second gearbox 58. The second gearbox 58 is structured and operable to transfer and distribute the torque output by the CVT 46 to one or more of the front wheels 22 via a front axle 62. The front axle 62 can be either a split axle for an independent suspension system, or a one-piece axle.

Additionally, although the prime mover 42 and CVT 46 are illustrated, by way of example, in the various figures to be at least partially disposed rearward of a longitudinal center of the vehicle 10, it is envisioned that the prime mover 42 and CVT 46 can be disposed anywhere along a longitudinal axis of the vehicle 10 and remain within the scope of the present disclosure. For example, in various embodiments, the prime mover 42 and/or the CVT 46 can be disposed forward of the longitudinal center of the vehicle 10, e.g., forward of a forward most part of the seating structure 38. Furthermore, although the prime mover 42, the CVT 46, and the first gearbox 50 are shown, by way of example, to be directly connected with each other, it should be understood that the drivetrain 44 can include one or more driveshafts (such as driveshaft 54) that operably interconnect one or more of the prime mover 42, the CVT 46, the first gearbox 50 and/or the second gearbox 58 based on the respective location of the prime mover 42 and CVT 46 along the vehicle longitudinal axis, and the respective 2WD or 4WD configuration of the drivetrain 44.

As used herein, the word "forward" and the phrase "forward of" are used to describe the direction from a named component or structure toward the front of the vehicle 10. For example, the statement that the prime mover 42 is mounted to the chassis 14 "forward of" the longitudinal center means the prime mover 42 is mounted to the chassis 14 within an area that extends from the longitudinal center of the chassis 14 to the front of the chassis 14 at the front of the vehicle 10 adjacent the front wheels 22. Similarly, as used herein, the word "rearward" and the phrase "rearward of" are used to describe the direction from a named component or structure toward the rear of the vehicle 10. For example, the statement that the prime mover 42 is mounted to the chassis 14 "rearward of" the longitudinal center means the prime mover 42 is mounted to the chassis 14 within an area that extends from the longitudinal center of the chassis 14 to the rear of the chassis 14 at the rear of the vehicle 10 adjacent the rear wheels 18.

Referring now to FIGS. 2, 4, 5 and 8, in various embodiments, the present disclosure provides a housing 70 for the CVT 46 that is structured and operable to protect a primary pulley 74 of the CVT 46 (also referred to as the primary clutch), a secondary pulley 78 of the CVT 46 (also referred to as the secondary clutch), a pulley V-belt 82 of the CVT 46, and various other CVT components disposable therein from water, mud, dirt and other debris present in the ambient (exterior) environment. Moreover, as described below, the housing 70 is structured and operable, in cooperation with rotation of the primary pulley 74, to generate a vacuum effect or suction (e.g., creates a difference is air pressure between the ambient environment and an interior of the housing 70) that draws ambient air into, and circulates the air through, an interior of the housing 70 in order to thermally cool the CVT components.

Generally, the housing 70 comprises an inner cover 86, an outer cover 90, and a duct panel 94. The inner and outer covers 86 and 90 are connectable to each other to define an interior chamber 96 in which the primary pulley 74, secondary pulley 78 and pulley V-belt 82 are disposed upon assembly of the CVT 46. The inner cover 86 includes an input shaft opening 98 that is sized and shaped to allow an output shaft 102 of the prime mover 42 to extend therethrough. The primary pulley 74 is connectable to the prime mover output shaft 102 such that, in operation, rotation of the output shaft 102 and the torque generated thereby is delivered to the primary pulley 74. The inner cover additionally includes a torque output opening 106 that is sized and shaped to allow the secondary pulley 78 to be operably connected, e.g., via the first gearbox 50, to at least one of the rear and/or front axles 52 and/or 62 such that torque output by the secondary pulley 78 is delivered to at least one of the rear and/or front wheels 18 and/or 22.

For example, in various embodiments, an input shaft 110 of the gearbox 50 can extend through the torque output opening 106 such that the secondary pulley 78 is connectable to the gearbox input shaft 110. Therefore, torque generated by the prime mover 42 will be delivered via the output shaft 102 to the primary pulley 74, whereafter the primary pulley 74 will deliver torque, via the pulley V-belt 82, to the secondary pulley 78, whereafter the torque received at the secondary pulley 78 will be delivered to the gearbox 50.

In various embodiments, the primary pulley 74 is structured and operable to deliver a continuously variable torque to the secondary pulley 78. That is, the primary pulley 74 is structured and operable to continuously variably increase, unchange, and decrease the torque received from the prime mover output shaft 102 when transferring the torque to the secondary pulley 78. Put another way, a torque transfer ratio of the torque received by the primary pulley 74 from the prime mover 42 versus the torque delivered to the secondary pulley 78 from the primary pulley 74 can be continuously varied via operation of the primary pulley 74.

Referring now to FIGS. 4, 5, 6, 7 and 8, in various embodiments, the primary pulley 74 comprises a shaft or sleeve 118, a static sheave 122 that is fixedly connected to the shaft 118, and a dynamic sheave 126 structured and operable to rotate with the shaft 118 and simultaneously controllably move axially along the shaft 118 in the $X^+$ and $X^-$ directions. The shaft 118 is engageable and connectable (e.g., via a splined connection) to the prime mover output shaft 102. The static sheave 122 includes a beveled inner face 130 and an outer face 134. The dynamic sheave 126 comprises a beveled inner face 138 and a linear movement mechanism 142 that is structured and operable to controllably move the dynamic sheave 126 axially along the shaft 118 in the $X^+$ and $X^-$ directions. A V-channel 146 is formed between the opposing beveled inner faces 130 and 138 of the static and dynamic sheaves 122 and 126, and the V-belt 82 is disposed within the V-channel 146. Controlled axial movement of the dynamic sheave 126 along the shaft 118, via the linear movement mechanism 142, varies a width of the V-channel 146, which in turn varies a diameter, or radial distance from the shaft 118, at which the V-belt 82 travels within the V-channel 146, which in turn various the torque transfer ratio of the primary pulley 74.

In various implementations, the axial movement of the dynamic sheave 126 along the shaft 118 can be controlled by a vehicle controller and/or a CVT controller (not shown). The CVT controller can be a controller that is communicatively connected to, or integrated as part of, a main vehicle controller that is typically understood to be an embedded system that controls one or more of electrical systems and/or subsystems the vehicle 10. Generally, the CVT controller can be any suitable hardware and/or software based controller that is structured and operable to control operation of the CVT as described herein. For example, it is envisioned that the CVT controller can comprise one or more, or be part of, application specific integrated circuit(s) (e.g., ASIC(s)), combinational logic circuit(s); field programmable gate array(s) (FPGA); processor(s) (shared, dedicated, or group) that execute software code; and/or other suitable hardware components that provide the CVT functionality described herein and remain within the scope of the present disclosure.

The duct panel 94 includes a center opening 114 and is mounted to the inner cover 86 such that the inner cover input shaft opening 98 and the duct panel center opening 114 are adjacent each other. The duct panel center opening 114 is structured and operable to allow the prime mover output shaft 102 to extend therethrough. In various embodiments, the inner cover input shaft opening 98 and the duct panel center opening 114 can be coaxially aligned. Additionally, the duct panel 94 is mounted to the inner cover 86 such that when the primary pulley 74 is disposed within the interior chamber 96, the duct panel 94 is disposed between the outer face 134 of the primary pulley static sheave 122 and the inner cover 86. Furthermore, the duct panel 94 and the inner cover 86 are structured such that an air duct 150 is defined between the inner cover 86 and the duct panel 94. Still further, the duct panel 94 is connected to, or forms at least a portion of, an ambient air inlet 162 of the housing 70 such that the air duct 150 includes the air inlet 162 and is fluidly connected to the ambient air via the air inlet 162. It is envisioned that the air inlet 162 can be formed within the inner cover 86, within the outer cover 90, within the duct panel 94 or any combination thereof when the inner and outer covers 86 and 90 and the duct panel 94 are interconnected.

The air duct 150 fluidly connects ambient air from an ambient environment 154 external to the housing 70 with the interior chamber 96 of the housing 70, via the center opening 114. More particularly, the air duct 150 and the duct panel center opening 114 are structured and operable to allow the ambient air to be drawn, via a vacuum effect or suction generated by the primary pulley 74, into and through the air duct 150 and into the housing interior chamber 96 (see FIGS. 9A and 9B). More specifically, as described below, the rotation of the primary pulley 74 creates a difference is air pressure between the ambient environment and the interior chamber 96 of the housing 70 that draws the ambient air through the air duct 150 into the housing interior chamber 96. As used herein, the term 'vacuum effect' will be understood to mean the suction or drawing of air from a first area (e.g., the ambient environment) to a second area (e.g., the interior chamber 96 of the housing 70) caused by creating a lower pressure within the second area (e.g., the interior chamber 96 of the housing 70) than exists at the first area (e.g., the ambient environment). For example, due to the structure of the primary pulley 74, as described below, rotation of the primary pulley 74 will create a lower air pressure within the interior chamber 96 of the housing 70 than is present in the ambient environment external to the housing 70, thereby generating a vacuum effect that will draw air from the ambient environment into the housing interior chamber 96 via the air duct 150 and the duct panel center opening 114.

Figure 6:
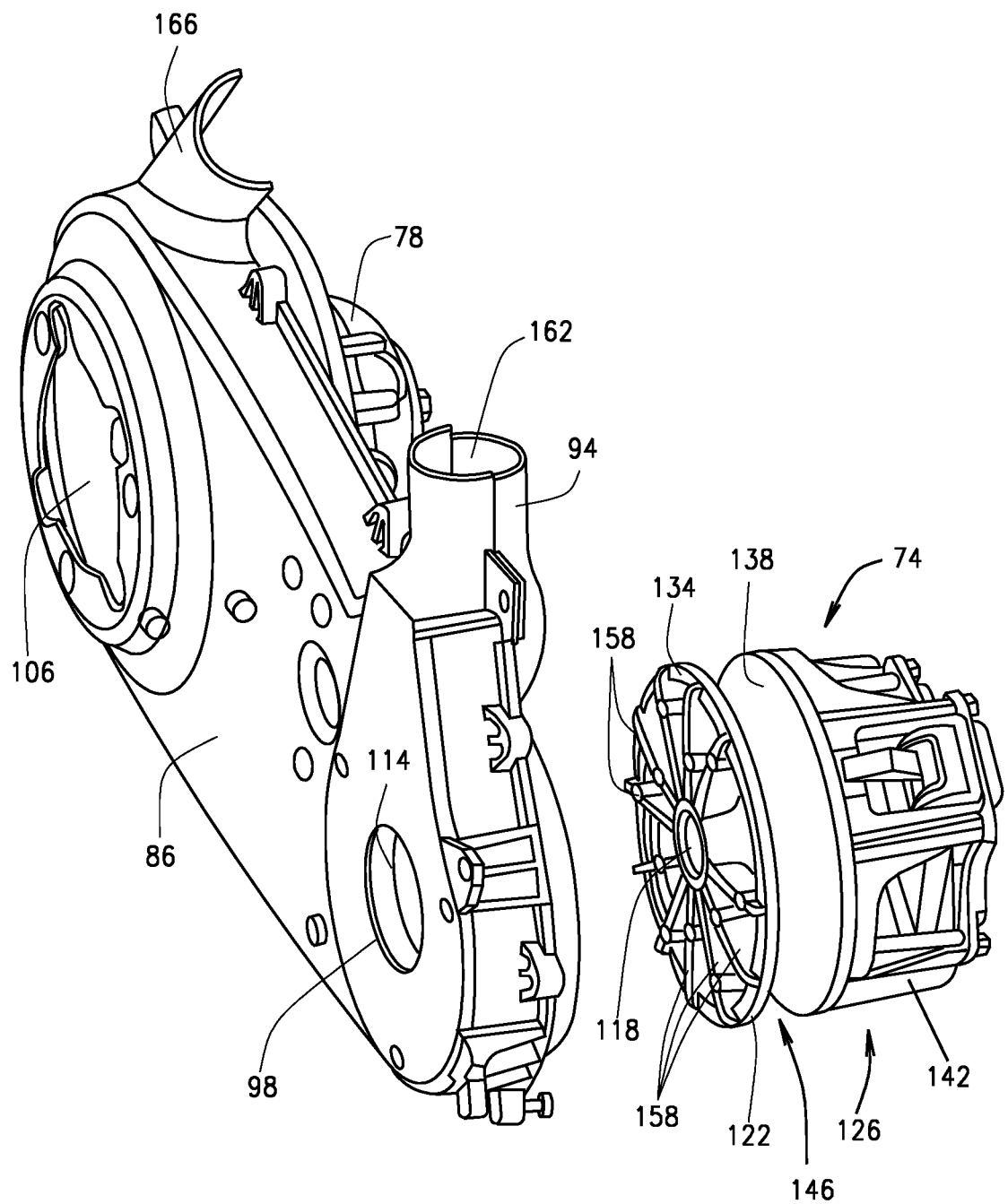
FIG. 6 is an isometric view of the inner cover and a primary pulley of the CVT shown in FIG. 1 illustrating a plurality of low pressure generating fins disposed on an outer face of a static sheave of the primary pulley, in accordance with various embodiments of the present disclosure.
Figure 7:
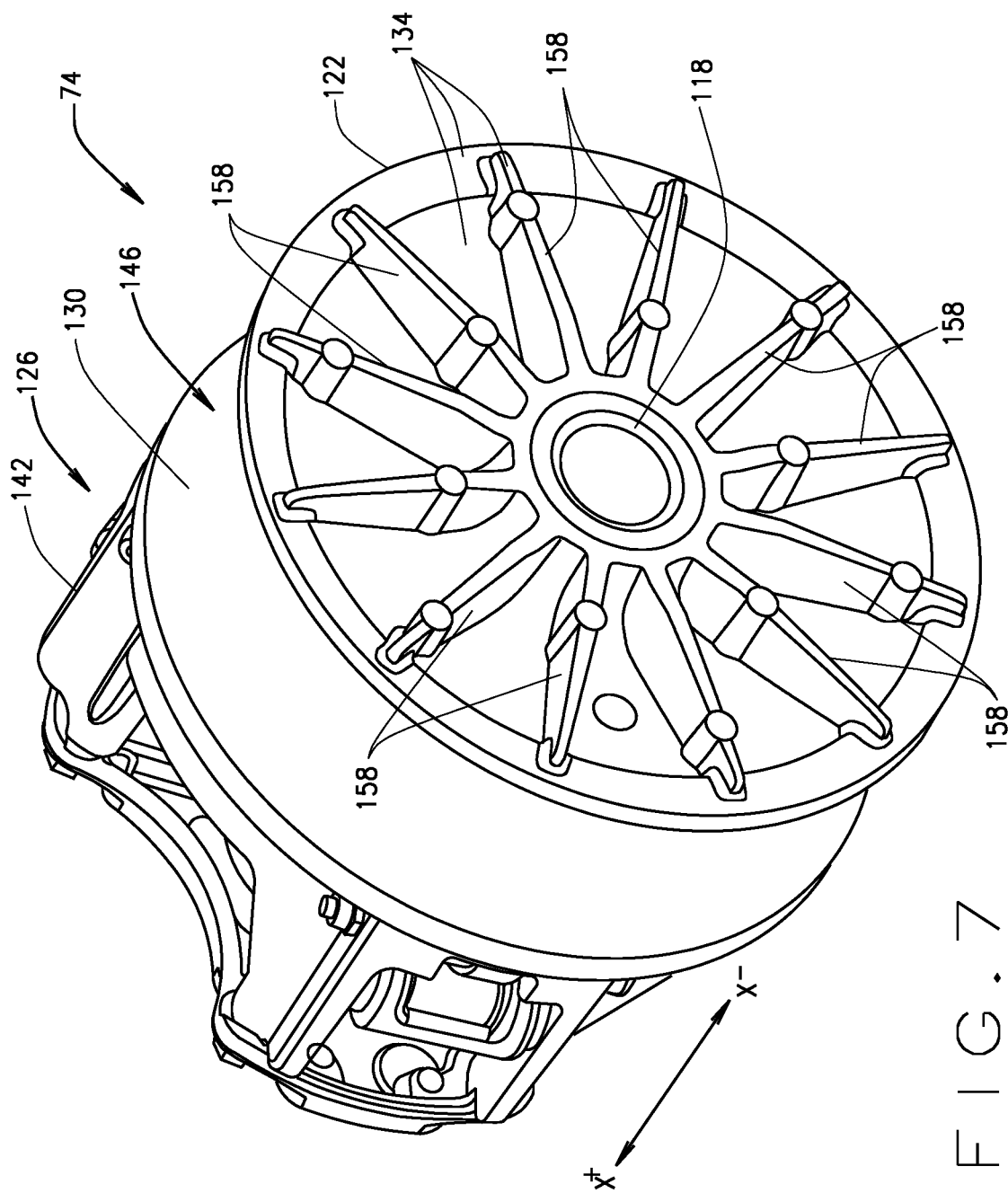
FIG. 7 is an isometric view of the primary pulley of the CVT shown in FIG. 1 illustrating the plurality of low pressure generating fins disposed on the outer face of the static sheave, in accordance with various embodiments of the present disclosure.
Figure 8:
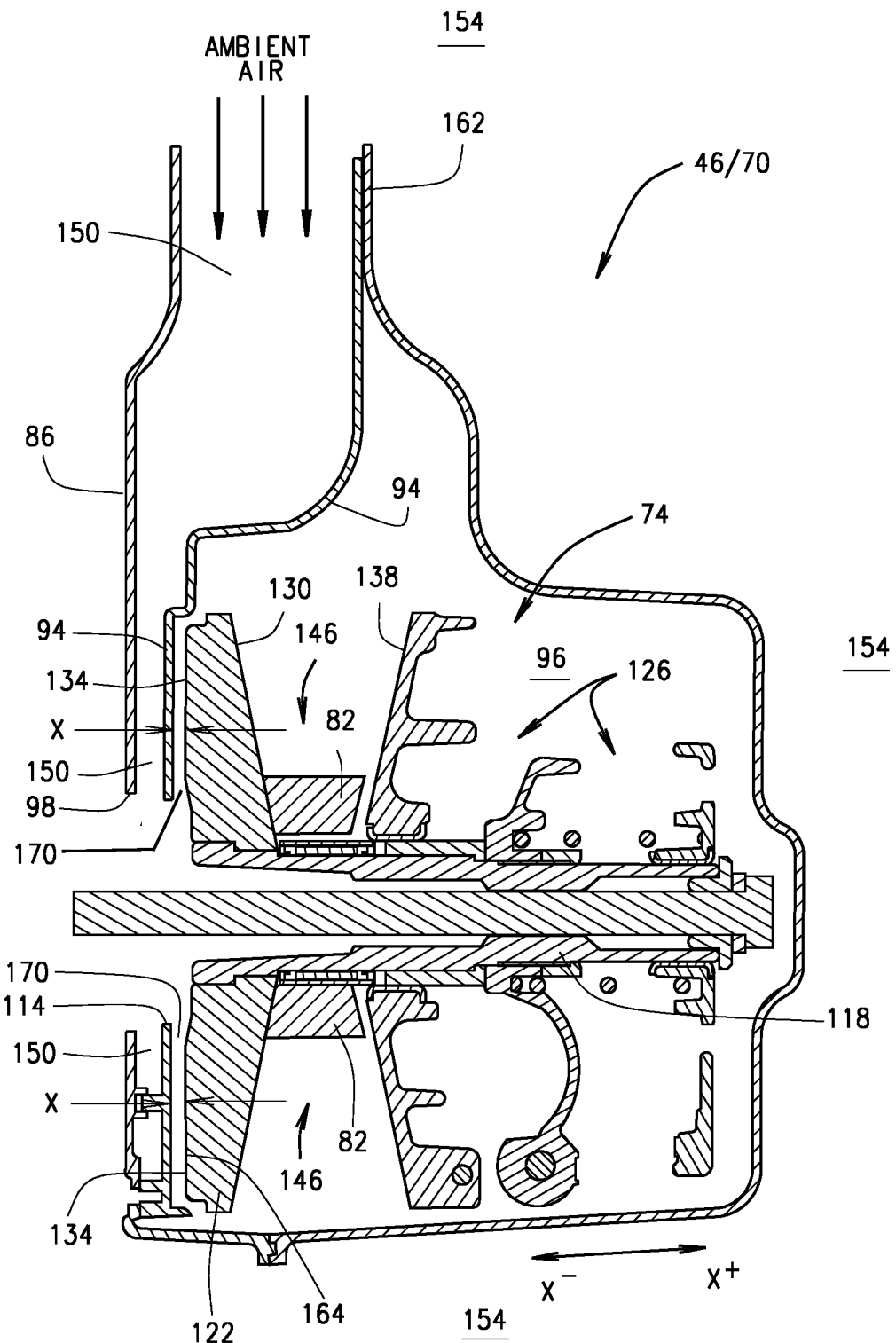
FIG. 8 is cross-sectional view of the CVT and primary pulley, in accordance with various embodiments of the present disclosure.

As best illustrated in FIGS. 6 and 7, in various embodiments, the outer face 134 of the primary pulley static sheave 122 comprises a plurality of low pressure fins 158 extending radially outward from the pulley shaft 118. The low pressure fins 158 are structured and operable to generate a vacuum effect at the duct panel center opening 114 and within the air duct 150 as the primary pulley 74 is rotated. The outer face 134 of the primary pulley static sheave 122 can include any number of low pressure fins 158 having any shape and configuration suitable to generate the vacuum effect within the air duct 150. Specifically, the low pressure fins 158 are sized and shaped to generate low pressure within a low pressure gap 170 between the static sheave outer face 134 and the duct panel 94 as the primary pulley 74, and hence static sheave 122, rotate via rotation of the prime mover output shaft 102. The low pressure in turn generates a vacuum effect at the duct panel center opening 114 and within the air duct 150 that draws the ambient air though the duct 150 into the interior chamber 96. More specifically, the duct panel 94 is shaped such that when the primary pulley 74 is connected to the prime mover output shaft 102, the static sheave outer face 134 that includes a distal edge of each low pressure fin 158, is disposed in a specific spaced apart relation with a sheave-side face 164 of the duct panel 94. The spaced apart relation between the primary pulley static sheave outer face 134 and the duct panel sheave-side face 164 defines the low pressure gap 170 therebetween (see FIG. 8).

Importantly, the low pressure gap 170 has longitudinal width X (relative to the longitudinal axis of the pulley shaft 118) that is calculated to position, locate and/or orient the low pressure fins 158 in suitable proximity to the duct panel sheave-side face 164 such that rotation of the low pressure fins 158 will create the low pressure between the duct panel sheave-side face 164 and static sheave outer face 134, e.g., within the low pressure gap 170, which will in turn generate the vacuum effect within the air duct 150. The width X is calculated to optimize the generation of vacuum effect within the air duct 150 based at least on the shape and size of the primary pulley 74, the shape and size of the low pressure fins 158, the shape and size of the housing interior chamber 96, the shape and size of the duct panel 94, and the rotational speed range of the primary pulley 74 (e.g., the rotational speed range of prime mover output shaft 102). For example, in various embodiments, the width X of the low pressure gap 170 can be between approximately 0.010 and 0.100 inches, e.g., between approximately 0.030 inches to 0.080 inches. As a further example, in various embodiments, the width X of the low pressure gap 170 can be between approximately 0.050 and 0.070.

Additionally, in some embodiments the input shaft opening 98 in the inner cover 86 is sufficiently sealed from the ambient environment so that low pressure generated by the low pressure fins 158 generates the vacuum effect specifically within the air duct 150, and that the vacuum effect is enhanced or optimized within the air duct 150. For example, in various embodiments, the inner cover can be mounted to the prime mover 42, wherein such mounting can provide a sufficient seal around the inner cover input shaft opening 98, sealing the input shaft opening 98 from the ambient environment. In various embodiments, in order to enhance or optimize the vacuum effect generated, the duct panel sheave-side face 164 has perimeter dimensions that are at least as large as perimeter dimensions of the primary pulley static sheave outer face 134. Accordingly, the entire area of the primary pulley static sheave outer face 134, and the low pressure fins 158 can be utilized to create the low pressure within the low pressure gap 170, and hence enhance or optimize the vacuum effect generated thereby within the air duct 150.

Figure 9B:
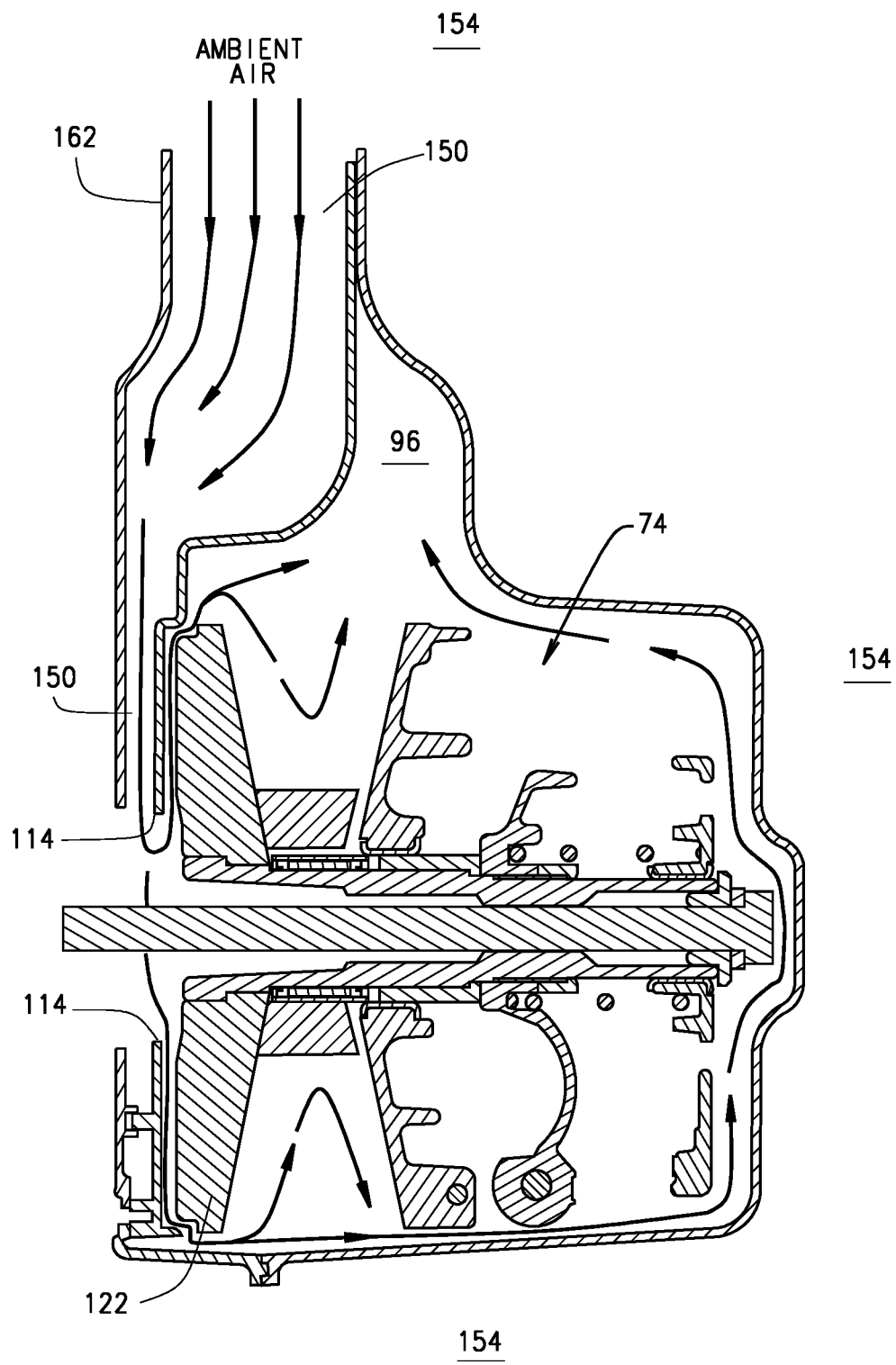
FIG. 9B is a cross-sectional view of the CVT and primary pulley further illustrating the air flow through the interior chamber of the CVT, in accordance with various embodiments of the present disclosure.

Referring additionally to FIGS. 9A and 9B, in order for the ambient air to be drawn through the air inlet 162 and air duct 150 into the housing interior chamber 96 by rotation of the low pressure fins 158, the housing 70 additionally includes an air exhaust outlet 166 that fluidly connects the interior chamber 96 with the ambient environment 154. It is envisioned that the exhaust outlet 166 can be formed within the inner cover 86, within the outer cover 90, or a combination thereof when the inner and outer covers 86 and 90 are connected. Accordingly, as described above, rotation of the primary pulley 74 and low pressure fins 158 generates a vacuum effect within the air duct 150 that draws cool ambient air through the air duct 150 and into the housing interior chamber 96. Subsequently, the rotation of the primary pulley 74, the low pressure fins 158, the secondary pulley 78 and the V-belt 82 disperse the air radially outward around the primary pulley static sheave 122, and swirl, mix, circulate the air through the interior chamber 96, around and across the primary pulley 74, the secondary pulley 78 and the V-belt 82, thereby extracting heat from and thermally cooling the primary pulley 74, the secondary pulley 78 and the V-belt 82. Thereafter, the heated circulated air is exhausted from the interior chamber 96 out into the ambient environment 154 through the exhaust outlet 166. Hence, operation of the CVT 46, e.g., rotation of the primary pulley 74, generates an air flow from the ambient environment 154, though the housing interior chamber 96, and back out into the ambient environment. The arrows in FIGS. 9A and 9B indicate, by way of example, the air flow though and circulation within the housing interior chamber 96.

Figure 10A:
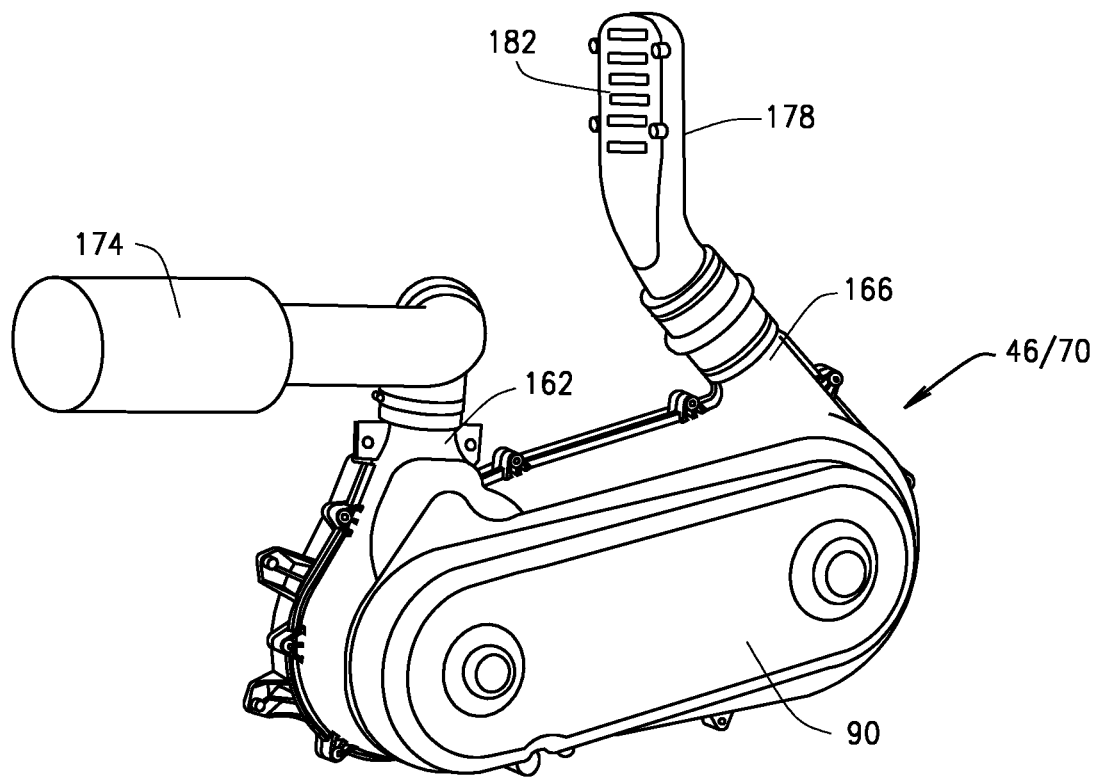
FIG. 10A is an isometric view of the CVT shown in FIG. 1 including an air inlet filter and an exhaust air outlet baffle, in accordance with various embodiments of the present disclosure.
Figure 10B:
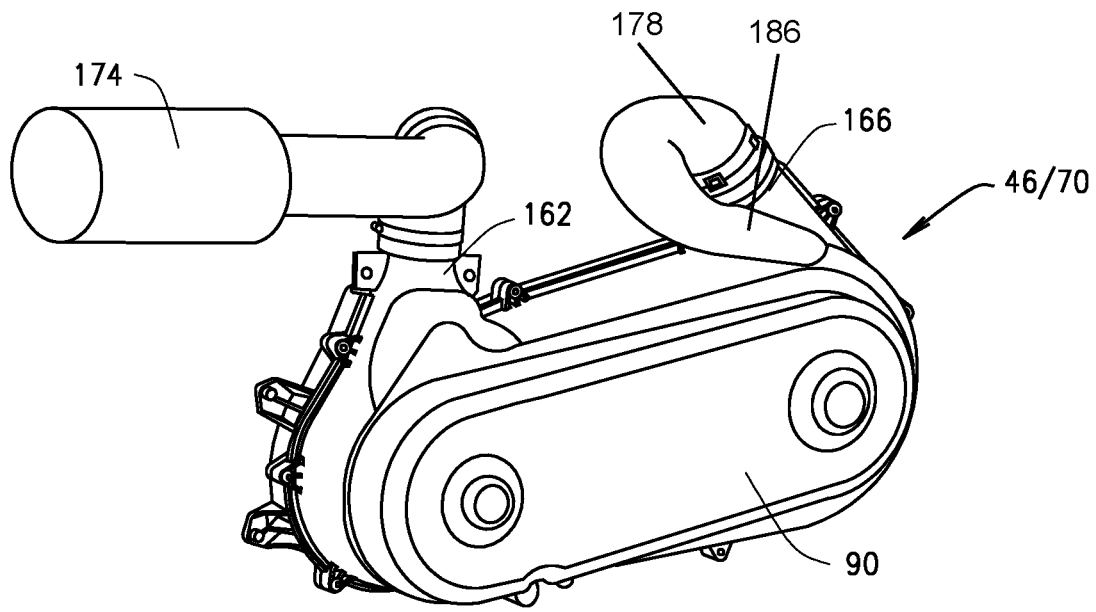
FIG. 10B is an isometric view of the CVT shown in FIG. 1 including an air inlet filter and an exhaust air outlet baffle, in accordance with various other embodiments of the present disclosure.

Referring now to FIGS. 10A and 10B, in various embodiments, the CVT 46 can include an air inlet filter 174 connectable to the ambient air inlet 162. The air inlet filter 174 is structured and operable to filter the ambient air drawn into the interior chamber 96 via the air duct 150 as described above. Particularly, the air inlet filter 174 is structured and operable to prevent or substantially impede such things as dust, dirt, water, leaves, debris, and other foreign matter from being drawn into the interior chamber 96 by the vacuum effect generated by the primary pulley static sheave 122 as described above. The inlet filter 174 can be any filter having any shape, size and construction suitable to filter the ambient air drawn into the housing interior chamber 96. It is envisioned that when connected to the air inlet 162 the air filter 174 can be located within the vehicle 10 anywhere that is conveniently accessible with a good supply of ambient air.

Additionally, in various embodiments, the CVT 46 can include an air outlet baffle 178 connectable to the air exhaust outlet 166. The air outlet baffle 178 is structured and operable to prevent or substantially impede foreign matter such as dust, dirt, water, leaves, debris, etc., from entering the ambient air exhaust outlet 166. The outlet baffle 178 can be any baffle or filter having any shape, size and construction suitable to prevent or substantially impede foreign matter such as dust, dirt, water, leaves, debris, etc., from entering the ambient air exhaust outlet 166 and consequently entering the housing interior chamber 96. For example, in various embodiments, as shown by way of example in FIG. 10A, the outlet baffle 178 can be a single face filter wherein the exhaust air is exhausted through a single face or side 182 of the filter while the remaining faces or sides of the baffle 178 are solid or enclosed within a housing. In such embodiments, the baffle 182 can be position such that the face 182 is substantially close to another object, e.g., a fender wall or other structure of the vehicle 10, so that the exhaust air is freely exhausted, but foreign matter is substantially impeded from contacting the face 182, and therefore substantially impeded from entering the housing interior chamber 96. Alternatively, in various other embodiments, as shown by way of example in FIG. 10B the outlet baffle 178 can be a hook shaped duct that is structured such that when connected to the air exhaust outlet 166 a distal end portion 186 of the hook shaped duct is directed downward, e.g., counter to the direction of gravitational force. According, due to the force of gravity, foreign matter will be substantially impeded from traveling upward the distal end portion 186 and within the baffle 182, against the force of gravity. Therefore, foreign matter will be substantially impeded from entering the housing interior chamber 96.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A duct panel for a continuously variable transmission housing, said panel comprising:
    a disc shaped sheave recess defined by an annular sheave face wall and a circumferential sidewall extending from and around an entire periphery of the annular sheave face wall, the disc shaped sheave recess structured and operable to receive at least a portion of an outer face of a static sheave of a primary pulley of a continuously variable transmission disposable within a continuously variable transmission housing, the duct panel mountable to the continuously variable transmission housing to define an air duct between the continuously variable transmission housing and a first side of the annular sheave face wall and define a low pressure gap between a second side of the annular sheave face wall and the outer face of the static sheave; and
    a duct center opening disposed within the annular sheave face wall, the duct center opening structured and operable to provide an air flow path between an ambient environment and the low pressure gap when the duct panel is mounted within the continuously variable transmission housing.

2. The duct panel of claim 1 further comprising at least a portion of an air inlet of the continuously variable transmission housing in which the duct panel can be mounted.

3. A continuously variable transmission housing, said housing comprising:
    an inner cover having an input shaft opening structured and operable to receive an output shaft of a prime mover of a vehicle in which the transmission can be implemented;
    an outer cover connectable to the inner cover to define an interior chamber structured and operable to enclose a continuously variable transmission primary pulley, secondary pulley and pulley belt within the interior chamber;
    a duct panel mounted to the inner cover such that an air duct is defined between the duct panel and the inner cover, the duct panel comprising:
        a disc shaped sheave recess defined by an annular sheave face wall and a circumferential sidewall extending from and around an entire periphery of the annular sheave face wall, the disc shaped sheave recess structured and operable to receive at least a portion of an outer face of a static sheave of a primary pulley of a continuously variable transmission disposable within the housing, the duct panel mounted to the housing such that the air duct is defined between the housing and a first side of the annular sheave face wall and a low pressure gap can be defined between a second side of the annular sheave face wall and the outer face of the static sheave; and a duct center opening disposed within the annular sheave face wall, the duct center opening structured and operable to provide an air flow path between an ambient environment and the low pressure gap such that ambient air can be drawn into the housing interior chamber.

4. The housing of claim 3 further comprising an ambient air inlet structured and operable to fluidly connect the air duct with ambient air exterior to the housing.

5. The housing of claim 4 wherein the duct panel further comprises at least a portion of ambient air inlet of the continuously variable transmission housing.

6. The housing of claim 3, wherein the low pressure gap is approximately 0.010 inches to 0.100 inches.

7. The housing of claim 3, wherein the housing comprises an air exhaust outlet structured and operable to fluidly connect the interior chamber with the ambient air.

8. A continuously variable transmission, said transmission comprising:

a primary pulley operably connectable to an output shaft of a prime mover of a vehicle, the primary pulley comprising:
  a primary pulley shaft operably connectable to the prime mover output shaft;
  a static sheave fixedly mounted to the primary pulley shaft; and
  a dynamic sheave structured and operable to controllably move axially along the primary pulley shaft;

a secondary pulley operably connectable to at least one wheel axle of the vehicle;

a pulley belt operably connecting the primary pulley to the secondary pulley to transfer torque from the primary pulley to the secondary pulley; and a housing comprising:
  an inner cover having an input shaft opening structured and operable to receive an output shaft of a prime mover of a vehicle in which the transmission can be implemented;
  an outer cover connectable to the inner cover to define an interior chamber structured and operable to enclose a continuously variable transmission primary pulley, secondary pulley and pulley belt within the interior chamber, a duct panel mounted to the inner cover such that an air duct is defined between the duct panel and the inner cover, the duct panel comprising:
  a disc shaped sheave recess defined by an annular sheave face wall and a circumferential sidewall extending from and around an entire periphery of the annular sheave face wall, the disc shaped sheave recess structured and operable to receive at least a portion of an outer face of a static sheave of a primary pulley of a continuously variable transmission disposable within the housing, the duct panel mounted to the housing such that the air duct is defined between the housing and a first side of the annular sheave face wall and a low pressure gap can be defined between a second side of the annular sheave face wall and the outer face of the static sheave; and
  a duct center opening disposed within the annular sheave face wall, the duct center opening structured and operable to provide an air flow path between an ambient environment and the low pressure gap such that ambient air can be drawn into the housing interior chamber.

9. The transmission of claim 8, wherein the housing further comprises an ambient air inlet structured and operable to fluidly connect the air duct with ambient air exterior to the housing.

10. The transmission of claim 9 wherein the duct panel further comprises at least a portion of ambient air inlet of the continuously variable transmission housing.

11. The transmission of claim 8, wherein the low pressure gap is approximately 0.010 inches to 0.100 inches.

12. The transmission of claim 8, wherein the housing comprises an air exhaust outlet structured and operable to fluidly connect the interior chamber with the ambient air.

* * * * *